United States Patent

[11] 3,630,114

[72] Inventors William W. Bunting, Jr.
Wilmington, Del.;
Robert E. Buskirk, Pennsville, N.J.
[21] Appl. No. 28,775
[22] Filed Apr. 15, 1970
[45] Patented Dec. 28, 1971
[73] Assignee E. I. du Pont de Nemours and Company
Wilmington, Del.

[54] POLYMERIC FILAMENT SHEET SLITTING
10 Claims, 12 Drawing Figs.
[52] U.S. Cl. .................................................. 83/23,
82/46, 82/101, 83/56, 83/433, 83/651, 83/701
[51] Int. Cl. ........................................................ B26d 5/00
[50] Field of Search ............................................ 83/56, 433,
425, 651, 661, 701, 23; 82/46, 101

[56] References Cited
UNITED STATES PATENTS
3,395,204 7/1968 Olsson et al. .................. 83/661 UX
3,545,322 12/1970 Zychal .......................... 83/661 X Primary Examiner—James M. Meister
Attorney—Harry J. McCauley ABSTRACT: Process and apparatus for the slitting of polymeric, poromeric, elastomeric and regenerated cellulose films, nonwoven webs embodying polymeric threads, filaments or staple fibers, and the like, and the slit product thereof, wherein the sheet material is advanced against a polymeric filament cutting means drawn therethrough.

PATENTED DEC 28 1971 3,630,114

SHEET 1 OF 8

INVENTORS
William W. Bunting, Jr.
Robert E. Buskirk
BY Harry J. McCauley
ATTORNEY

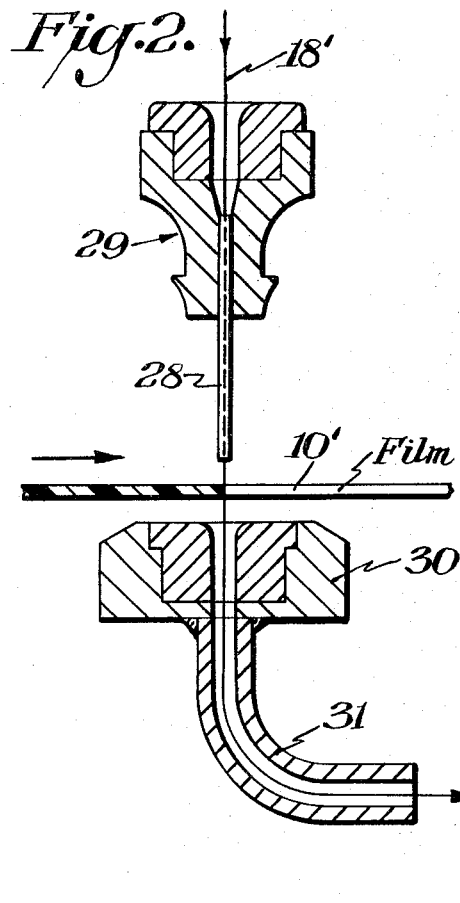
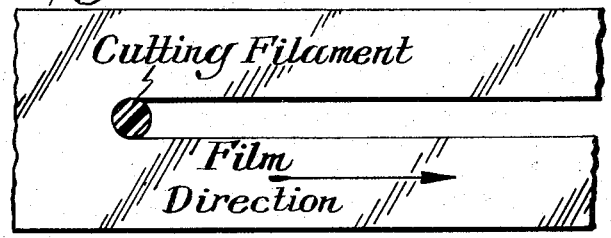
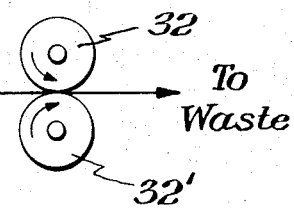
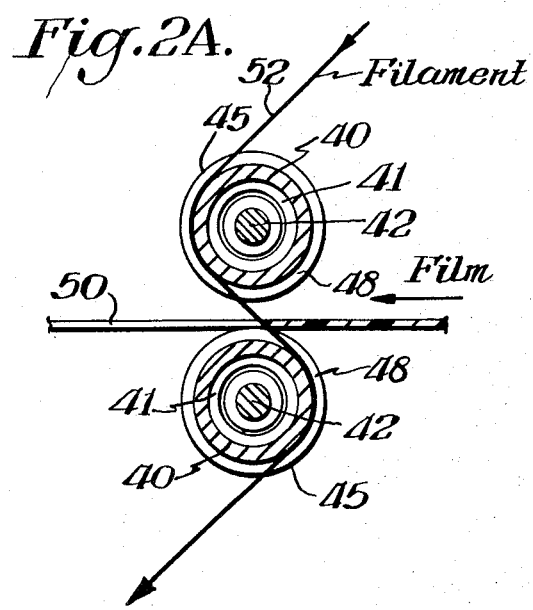
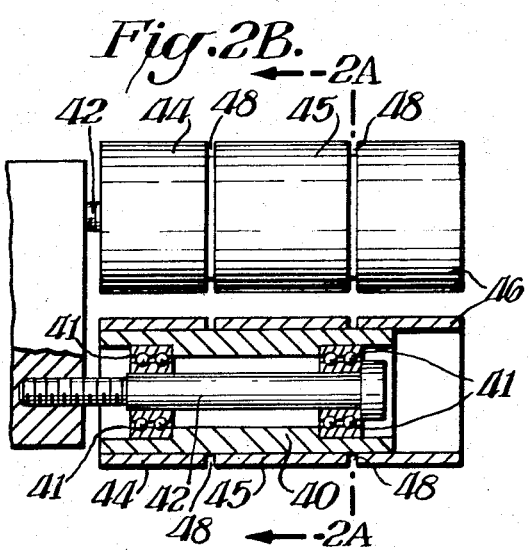
INVENTORS
William W. Bunting, Jr.
Robert E. Buskirk
BY Harry J. McCauley
ATTORNEY

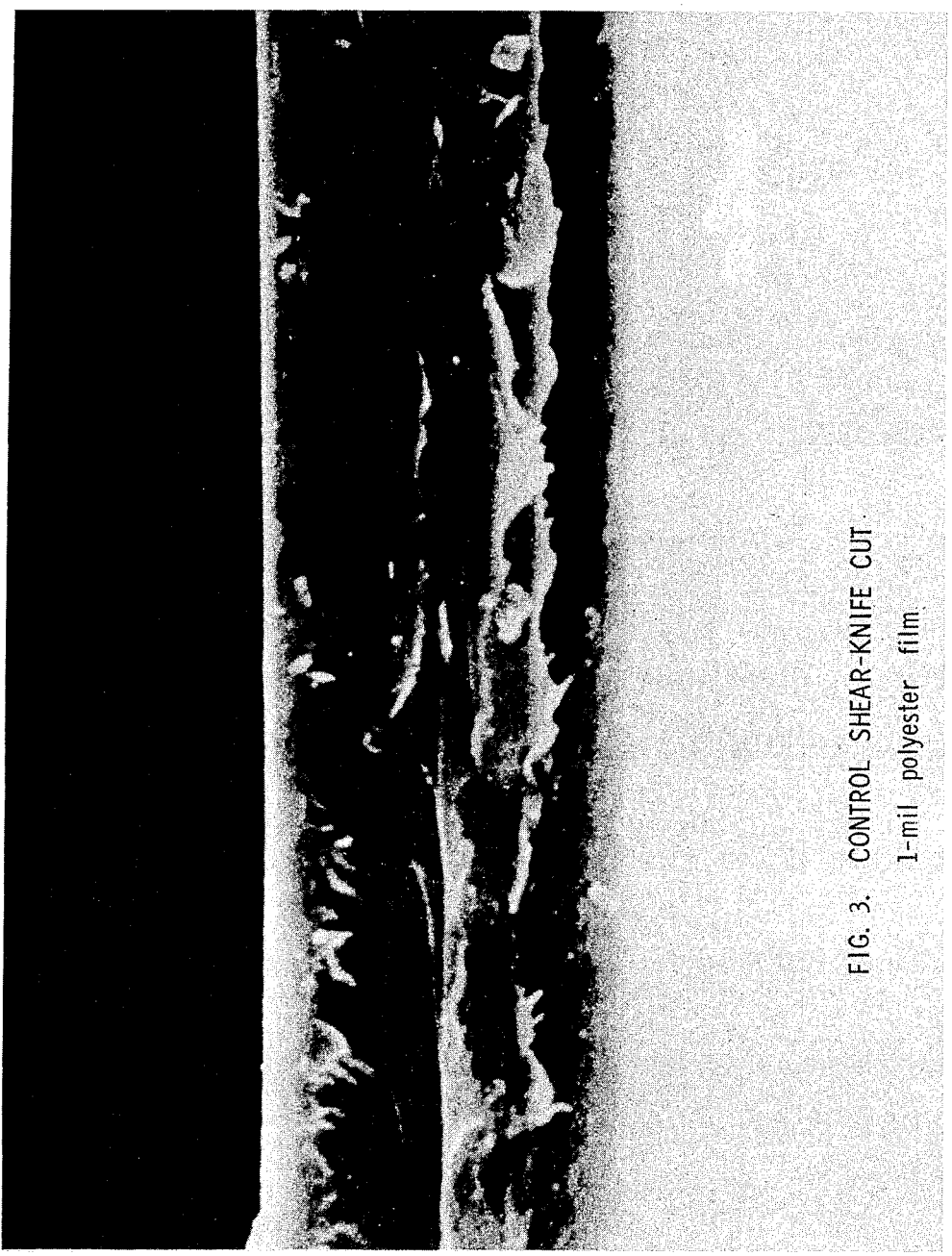
FIG. 3. CONTROL SHEAR-KNIFE CUT.
1-mil polyester film.

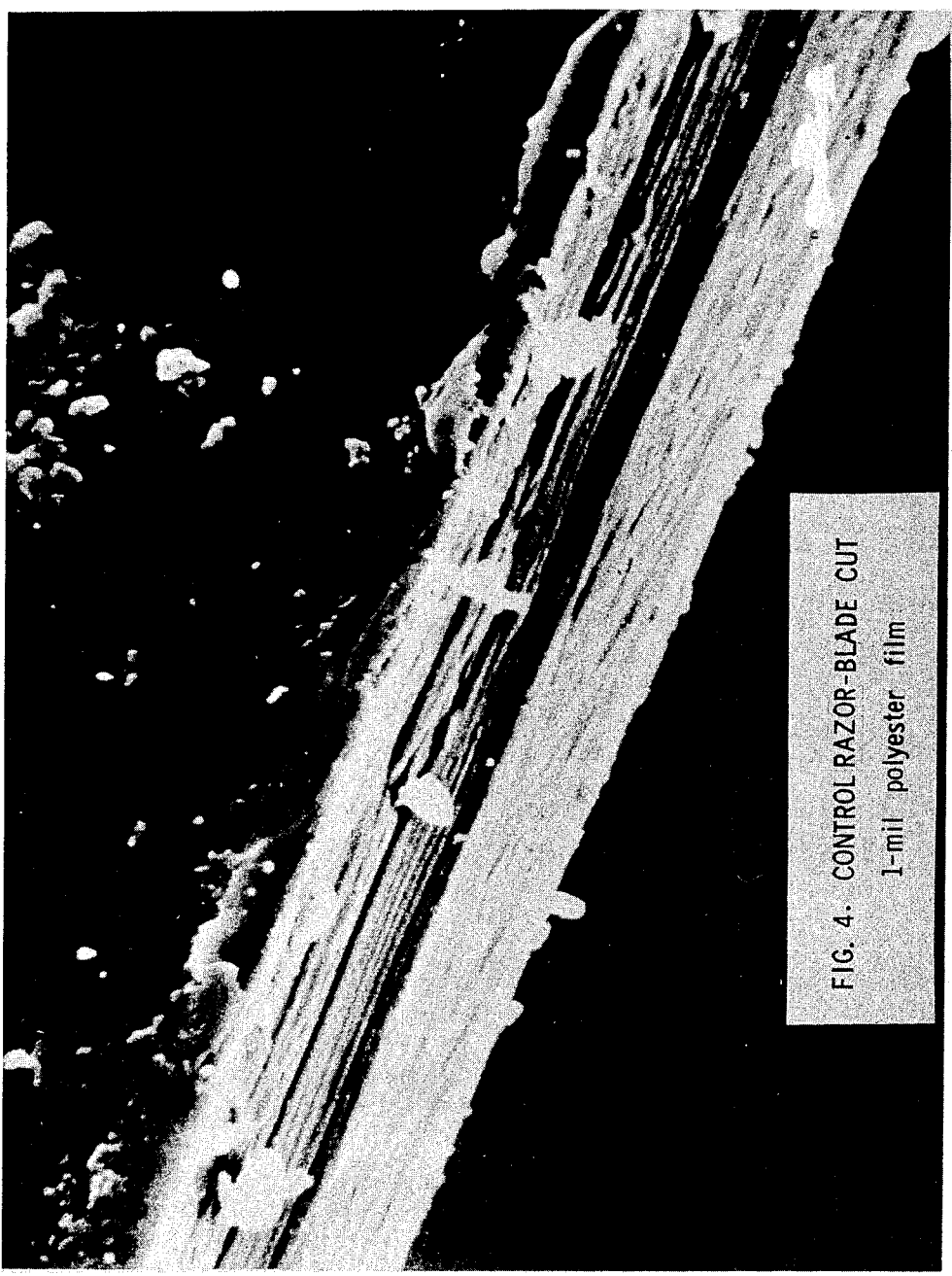
FIG. 4. CONTROL RAZOR-BLADE CUT
1-mil polyester film

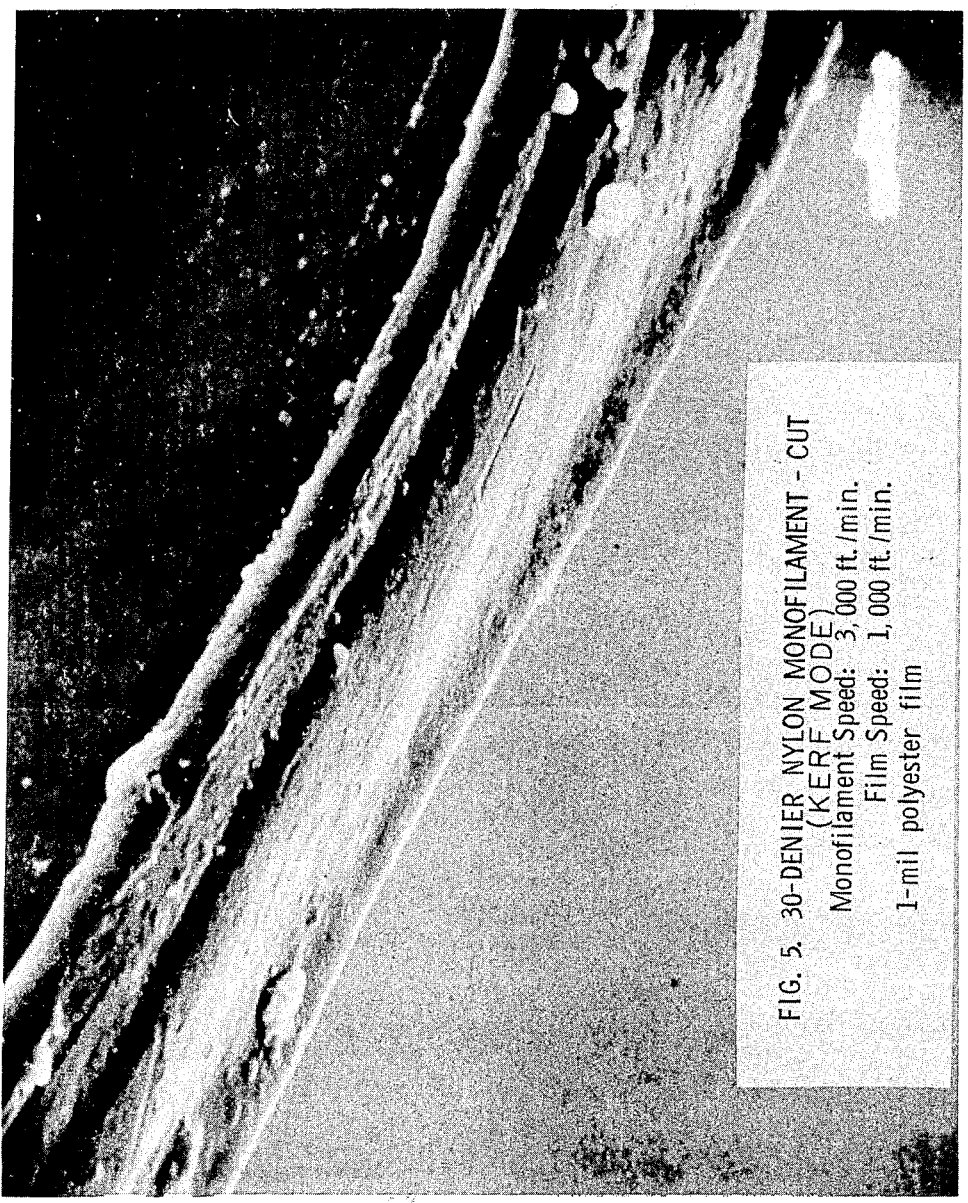
FIG. 5. 30-DENIER NYLON MONOFILAMENT - CUT (KERF MODE)
Monofilament Speed: 3,000 ft./min.
Film Speed: 1,000 ft./min.
1-mil polyester film
INVENTORS
WILLIAM W. BUNTING JR.
ROBERT E. BUSKIRK
BY Harry J. McCauley
ATTORNEY

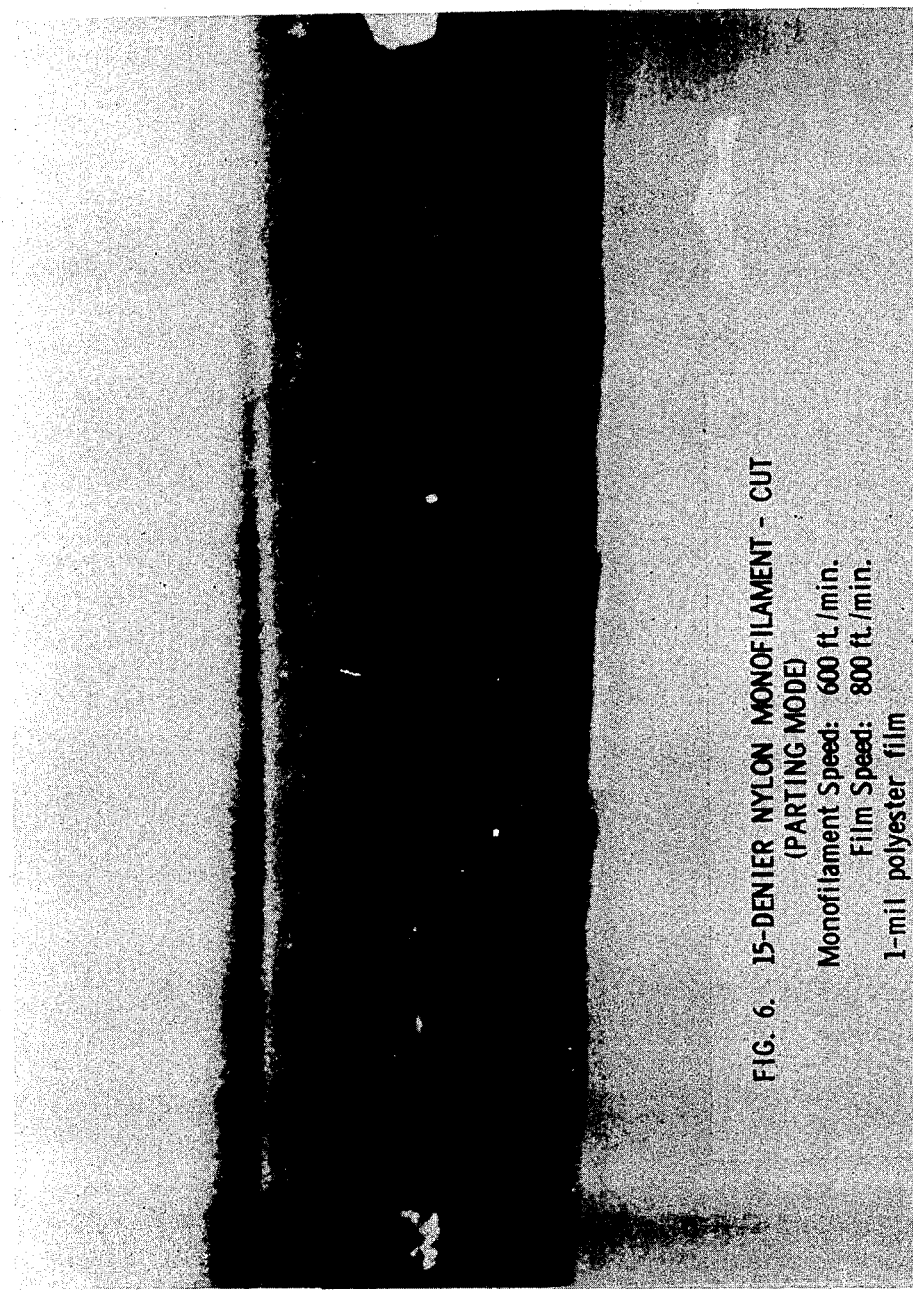
FIG. 6. 15-DENIER NYLON MONOFILAMENT – CUT
(PARTING MODE)
Monofilament Speed: 600 ft./min.
Film Speed: 800 ft./min.
1-mil polyester film

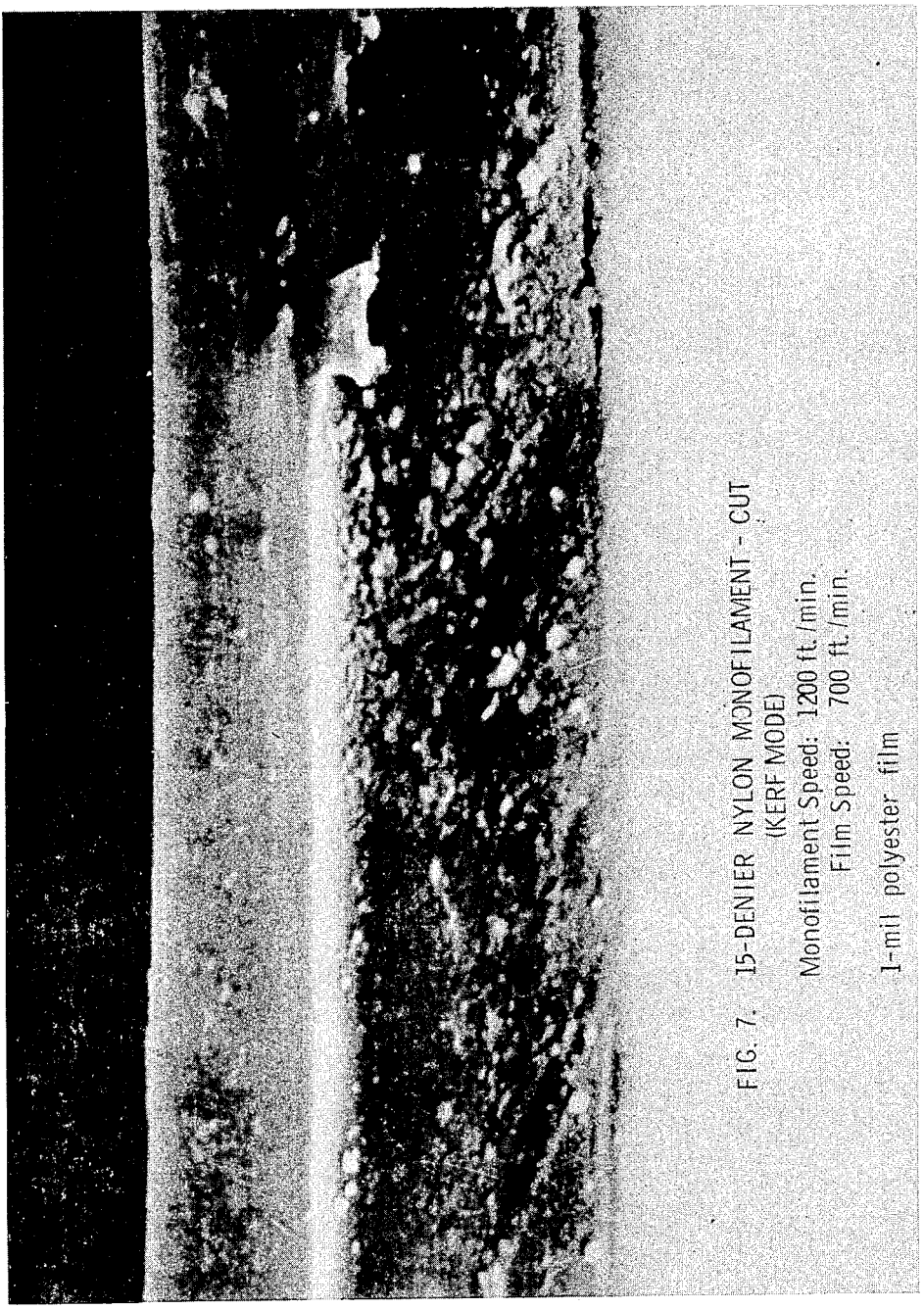
FIG. 7. 15-DENIER NYLON MONOFILAMENT – CUT (KERF MODE)
Monofilament Speed: 1200 ft./min.
Film Speed: 700 ft./min.
1-mil polyester film

FIG. 7A. 15-DENIER NYLON MONOFILAMENT - CUT
(KERF MODE)
Monofilament Speed: 6,000 ft./min.
Film Speed: 250 ft./min.
1.5-mil moisture-proof cellophane

POLYMERIC FILAMENT SHEET SLITTING

BRIEF SUMMARY OF THE INVENTION

Generally, this invention comprises the slit product and the process and apparatus for slitting sheet material of the type represented by polymeric, poromeric, elastomeric and regenerated cellulose films, nonwoven webs embodying polymeric threads, filaments or staple fibers, and the like comprising advancing the sheet material at a velocity in the range of about 2 ft./min. to about 4,500 ft./min. against a polymeric filament cutting means drawn through the sheet at a velocity in the range of about 25 ft./min. to about 9,000 ft./min.

DRAWINGS

Figure 1:
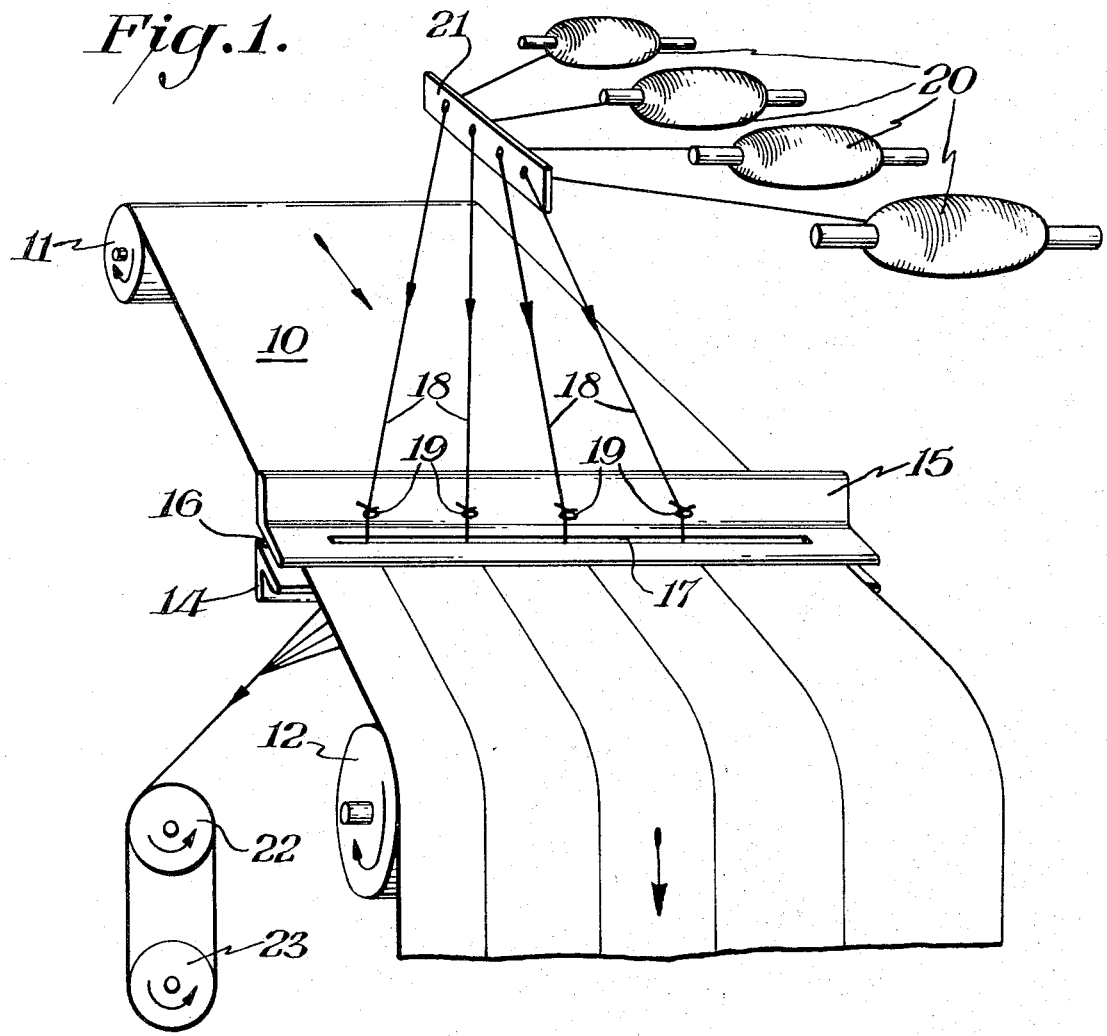
Figure 2C:
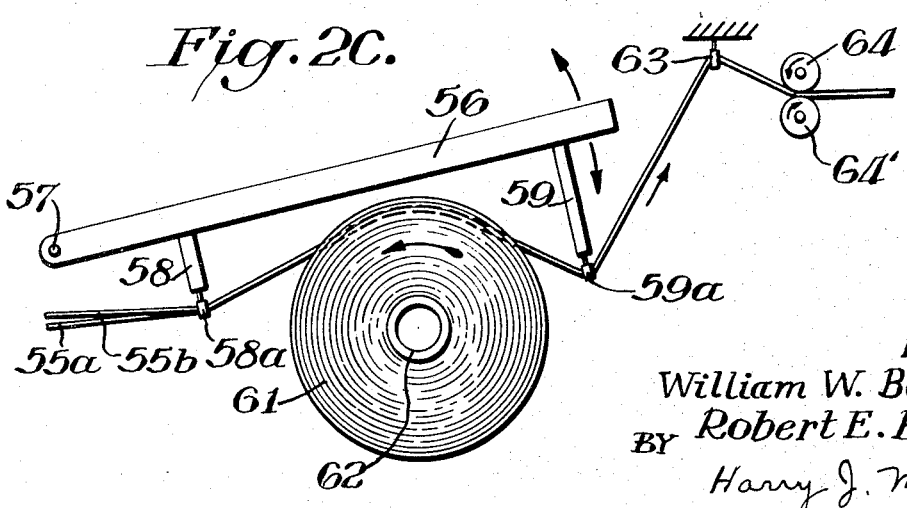

FIG. 1 is a partially schematic perspective view of a preferred apparatus for slitting sheet material according to this invention, FIG. 2 is a partially schematic cross-sectional side elevation view of a second embodiment of apparatus which is well adapted for slitting in the kerf mode, FIG. 2A is a section taken on line 2A—2A, FIG. 2B, of a third embodiment of polymeric filament slitting apparatus, FIG. 2B is a front elevation view of the apparatus of FIG. 2A with one of the guide rolls shown in longitudinal cross section, FIG. 2C is a partially schematic side elevation view of a fourth embodiment of polymeric filament slitting apparatus especially adapted to on-the-roll slitting of nonwoven webs, FIG. 2D is a schematic plan view of a sheet slit in the kerf mode, FIG. 2E is a schematic plan view of a sheet slit in the parting mode, FIGS. 3—7, inclusive, and 7A are Stereoscan photographs (all 2,700 X magnification) taken in plan looking down at the slit edges for the following sheet material-slitting means combinations, wherein the polyester film was polyethylene terephthalate and the nylon cutting means was nylon 66 polyamide, FIG. 3 is a 1-mil polyester film slit by a conventional shear knife cutter, included as a control for comparison purposes, FIG. 4 is a 1-mil polyester film slit by an ordinary commercial razor blade, included as a control for comparison purposes, FIG. 5 is a 1-mil polyester film slit in the kerf mode using a 30-denier nylon monofilament as cutting means, FIG. 6 is a 1-mil polyester film slit in the parting mode using a 15-denier nylon monofilament as cutting means, FIG. 7 is a 1-mil polyester film slit in the kerf mode using a 15-denier nylon monofilament as cutting means, and FIG. 7A is a 1.5-mil coated moistureproof cellophane slit in the kerf mode using a 15-denier nylon monofilament as cutting means.

Specific examples reported in the following detailed description refer to nylon 66 polyamide as the "nylon" employed, whereas the "polyester" was, in all instances, polyethylene terephthalate.

The slitting of sheet materials is conventionally accomplished by three principal mechanisms, i.e., rotary shear knives, score cutters, and razor blades. The capability of each of the conventional slitters for producing a smoothly cut edge in a rapidly traveling film or web is severely limited by the rapid wearing of the metal blades employed, which increases the roughness of the cut surface, affording stress points for the start of a tear, or otherwise marring the edge.

The necessity for a perfectly cut edge is especially apparent in the slitting of polymeric films, such as polyesters, for example, into magnetic tape products. Here any deviation from squareness or smoothness can cause inaccurate recording of sound reproduction, or interference with other information processing. In addition, in the manufacture of sheet products, metal cutting-edge replacement causes excessive downtime, as well as being both inconvenient and expensive. Moreover, the gradual development of dullness in the cutting edge is usually preceded by sufficient edge roughness to give sheets of low-quality cut, leading to subsequent objectionable tearing or ripping.

We have now found that we can obtain cut edges surpassing by several orders of magnitude the smoothness and squareness obtained with hitherto known techniques by using polymeric filaments as cutting means.

Accordingly, the objects of this invention include the provision of an improved sheet slitting process and apparatus, and one which continually presents a fresh cutting edge with attendant controlled edge quality, reduced debris and simplicity of operation. A further object is to provide a slitting process and apparatus adapted to slit a wide range of films, tapes and nonwoven webs, as well as composite and laminar film and tape products. Finally, the slit product obtained is characterized, in the two principal modes of production hereinafter taught, by an appreciably higher tear resistance than other slit products and, in the kerf-cut mode, by a narrow, localized edge region which has an altered structure exhibiting enhanced dye imbibition properties, unique optical properties enabling precise strip travel guiding, and other desirable features.

Some research has been done on the cutting action of nylon yarn delustered with various pigments, but this seems to have been of a theoretical nature, as shown by the literature references: (1) W. G. Settele "*Abrasion by Nylon Filaments*" S.V.F. Fachorgan (1960), 15, (1), 62, (2) A. Selwood "Abrasion of Guide Materials by Delustred Nylon Yarn," Transactions of the Textile Institute, T-276 (1962) and (3) J. Molgaard "A Coefficient of Friction which Increases with Increasing Load. Results with Undrawn Nylon Monofilaments, and a Theoretical Explanation," Proc. Phys. Soc., vol. 79 (1962). Certain tests were reported in these references wherein the sample, e.g., a metal foil, was held stationary and the yarn pulled symmetrically over the edge of the specimen. The results obtained were not very encouraging and there was no suggestion that a polymeric filament could constitute a practical cutting tool. Most important, there were no tests conducted on continuously feeding webs to be cut past the cutting edge of a traveling polymeric filament.

Patents have issued teaching the use of polymers as binding agents for abrasives or cutting agents, such as U.S. Pat. Nos. 2,154,436 "Abrasive," 3,395,204 "Cutting Semi-Plastic Bodies," 2,599,920 a reciporcatory strand saw "Apparatus for Severing Plastic Bodies," 2,712,987 "Abrading Belt and Method of Making It," and 3,430,390 strand saw "Cutting Machines and Tools for Composite Materials," but none teach the cutting of web from materials, nor would the apparatuses taught be applicable to such service.

Surprisingly, we have found that polymeric filaments containing a variety of finishes and abrasive filling materials, such as delusterants, do not function conspicuously better as cutting means than unloaded polymers.

In fact, the cutting action of polymeric filaments is not well understood, and certainly appears to be basically different than cutting effected by a sharp edge. "Edge" seems to have no bearing on cutting by filament and, while we have conducted experiments with a wide variety of filament cross sections ranging from a standard round nylon monofilament through elliptical and even trilobal cross sections, the effect perceived was minor. Ordinarily, we prefer a round cutting filament cross section, because a consistent square cut edge is thereby obtained, although there may be web products having inherent characteristics such that special filament cross sections are particularly effective in their cutting.

Similarly, we prefer monofilaments as cutting means over multifilaments, although the latter are, of course, completely operative. However, round monofilaments are highly uniform in the cross section presented to webs to be cut and this gives the squarest edge cut.

Polymeric filaments in the denier range of about 5 (equivalent to about 1 mil) to 1,100 (equivalent to about 14 mils) are preferred and polyamide, polyester, and polyolfein compositions have all proved exceedingly effective. Such filaments have all displayed exceptional tensile strength and inherent physical properties which account for their operability, as compared with ineffective natural materials such as cotton, for example, and, in addition, are so low in cost that one-time use is completely economical, thereby insuring a consistent high quality virgin confrontation of web-to-be-cut with cutting filament at all times.

Cutting according to this invention is in three general modes which are hereinafter denoted as (1) "parting," (2) "kerf cutting" and (3) "transitional," which are observed to have a dependence on the relative velocities of cutting filament and sheets being slit. Thus, if the cutting filament has a linear velocity in excess of the sheet velocity there is, in general, kerf cutting, as illustrated in FIG. 2D, under which conditions material is physically removed from the sheet and carried away by the filament in its passage through the sheet. If the sheet travels at a greater velocity that the cutting filament, there is generally obtained "parting," as illustrated in FIG. 2E, under which conditions the sheet appears to separate, or tear, immediately ahead of the cutting filament with very little or no perceptible sheet material removal by the filament's transit. The transitional mode is that existing intermediate the parting and kerf cutting modes, and occurs generally in a narrow region inclusive of the point where linear velocities of sheet and filament are equal, the exact location and the extent of this region varying with particular sheet and filament properties as well as with the slitting environment.

We have observed that parting and kerf cutting usually occur over substantial speed ranges as regards most sheet materials. However, some materials have very narrow kerf cutting as well as transitional regions and slitting of these is better accomplished according to the parting mode, as is the case, for example, with thick (2 mils and greater) polyester films. It may be that yet other materials behave in an opposite manner, in that they are amenable, as a practical matter, to kerf cutting as opposed to both the parting and transitional modes as is the case, for example, for batts of nonwoven fibrous materials. Because of this diversity in behavior, arising as it does from the inherent properties of the sheet material itself, complicated, perhaps, by the properties of the cutting filament as well, it is not possible to define, in overall terms, specific velocities which result in slitting according to a given mode. However, the identification of a particular mode at which cutting is being conducted can be achieved with certitude by observing whether sheet material is being removed by the filament, and, if need be, the verification of characteristic structural changes occurring in the cut edge region incident to kerf cutting.

Fortunately, cutting in all three modes produces a consistent, true, high quality square edge which is, in most cases, the primary objective of the invention. If cutting is the sole objective, the parting mode is preferred, where the manner of confrontation of the particular sheet material with the cutting filament permits, because the output of slit sheet per unit length of cutting filament is then maximum and best economy in terms of once-used filament is thereby realized. Certain materials, however, will be best slit in the kerf mode.

Referring to FIG. 1, a relatively simple design of apparatus according to this invention, well adapted to slitting in all three modes, is shown schematically in association with a film backwinding machine. Here film 10 is unrolled from a supply roll 11 and passed over a tensioning roll 12 from whence the slit product is directed to a rewinding apparatus, not shown.

Support for the sheet to be cut is afforded by passage between two oppositely arranged angle irons, 14 and 15, which, between them, define a nip 16 through which the sheet is pulled at relatively high velocity by the rewinding apparatus.

The angle irons are slotted in line oppositely one another to provide a passage 17 through which the cutting filaments 18 travel, precise guiding being facilitated by conventional pigtail yarn guides 19 mounted on the angle irons immediately adjacent to, and in line with, slotted apertures 17. As indicated, the cutting filaments are drawn from supply bobbins 20 and directed, via appropriately apertured guide plate 21, through slots 17 and film 10, after which they are taken up on a common pair of advancing rolls 22, 23 which lead them off to any convenient collection point, not detailed.

Another embodiment of apparatus, particularly well suited to kerf cutting, is that shown in FIG. 2, the cutting filament supply means being identical with that of FIG. 1 and therefore not again detailed.

Here the running cutting filament 18' is guided longitudinally by threading it through a hypodermic needle 28, the support head for which is denoted generally at 29. A companionate guide 30 is disposed in line with needle 28 on the opposite side of the film 10' to be slit, and this is provided with an arcuately formed discharge tube 31 through which the cutting filament is drawn off by vacuum and a pair of pinch rolls 32, 32'. The vacuum simultaneously removes any debris, dust or other particles which exist in the film cut region.

It is important that the cutting filament be accurately and consistently guided in its transit through the sheet to be slit, and this is accomplished by closely-spaced guides disposed as pairs one above and the other below the running sheet. Interguide spacings as close as one-eighth inch have been employed in tests hereinafter reported, whereas spacings as large as 2 inches were also found to be completely operative. In the cutting of roll materials, of course, guide spacing will depend on the roll diameter as hereinafter described with reference to FIG. 2C.

The cutting filaments exert little or no drag on the sheet being slit, and sheet draw-through tensions of the order of only 1–4 lbs./in. are required in direct proportion to the sheet gage. Cutting force is in general coplanar with the sheet, making sheet support unnecessary.

The cutting filament is, of course, pulled taut by the running sheet and an appreciable differential tension can be measured across the length passing through the sheet. This differential tension has a magnitude varying from a relatively high value for the kerf cutting mode to a somewhat lower value for the parting mode. However, the tension load contributed by the cutting operation is surprisingly small for the amount of work which is believed done, as determined by analysis of what occurs mechanically.

Thus, on the basis of measured differential tensions across specific sheet materials and filaments, their velocities during slitting, and other pertinent factors, very high energy values, of the order of 5 to $10 \times 10^7$ B.t.u./ft.$^2$-hr. can be computed for an individual cutting operation. Of course, a high proportion of this energy is removed as heat from the slitting zone by high speed removal of the cutting filament. Nevertheless, in kerf cutting especially, where relatively more filament comes into contact with unit film areas, enough heat energy is applied locally of the sheet to, in the case of polymeric films at least, change characteristics in ways clearly perceptible by conventional investigatory techniques.

For example, X-ray microdiffration and soft X-ray microshadowgraphs were made of confronting edges of a kerf-cut 1-mil polyester film slit at a film travel speed of 500 ft./min. by a 30-denier nylon monofilament running at 9,000 ft./min. For comparison, confronting edges of a slit in the same film made by a razor blade in the conventional manner were examined by the same techniques.

The razor-slit edge material displayed a pattern identical with the film bulk, showing considerable molecular orientation.

The kerf-cut edges gave a distinctly different pattern, demonstrating a considerable decrease in orientation. It was evident that kerf cutting temporarily increased the temperature of the material to a point where molecular rearrangements occurred.

Reproducible high contrast microradiographs confirmed definite changes within a 2–4 $\mu$m. wide swath of material bordering the monofilament slit. It is hypothesized that the effect obtained resembles the fire polishing of glass, in which the surface of material is heated close to the melting point. Under these conditions the viscous state of the material smooths edges. However, as hereinafter brought out, there is absolutely no beading or other objectionable edge thickening of the film.

Localized structural modification of film edges by monofilament working is advantageous, in that the slit edges characteristically exhibit an increased inhibition propensity for dyes and other liquid phase additives, making it possible to apply substances of this nature as spaced visual lengthmarking indicia or the like. In addition, the unique edge structure, detectible to polarized light, permits precise edge guiding of the running film.

To the extent that additives do not destroy the polymeric filament's cutting capability, the traveling filament per se can indeed be employed as an applicator of additives which it is desired to apply to concurrently freshcut slits made according to this invention. Thus, antistatic agents, dyes, unblocking substances and even materials contributing an end-use function, such as the introduction of a preselected magnetization, optical or other characteristic, can all be applied speedily and economically, in highly controlled amounts to precisely preselected sites incident to slitting.

The principal objective of the invention, however, is the consistent obtainment of square, clean slit edges in a wide variety of sheet materials which have hitherto been extremely difficult to cut. In fact, cut edges obtained by our invention surpass, by several orders of magnitude, the smoothness and squareness achieved by any other known slitting techniques, including also the recent use of laser beams for web-slitting which, while reasonably effective as regards smoothness, unfortunately produce degraded and beaded slit edges.

The extent of cut edge improvement is best perceived by a comparison of the Stereoscan photographs, FIGS. 3-7 and 7A, inclusive, all made in plan relationship to the sheet cut edges at 2,700 X magnification. The Stereoscan technique is described in detail in an article entitled "The Characteristics and Applications of the Scanning Electron Microscope" by S. Kimoto and J. C. Russ, *American Scientist*, 57, 1, pp. 112-133 (1969).

FIG. 3 shows the cut edge produced on a 1 mil polyester film by a pair of conventional coacting rotating shear knives, a widely used slitting device employed in the manufacture of magnetic tape products. This apparatus employs sets of edge-sharpened discs spaced on parallel power-driven shafts disposed above and below the moving sheet and overlapping slightly at the point of cutting contact. The photographed cut was obtained using recommended slitter operational practice with 3 inch dia. freshly sharpened circular slitting discs turning at 955 r.p.m. and with a running sheet velocity of 700 ft./min.

The cut edge obtained was ragged, in that "tails" hung from the edge surface. More serious, a pinched flange portion is seen to run midway along the cut edge, this forming from a sustained rubbing action caused by sidewall friction accompanying a slight built-in speed differential of approximately 1 percent between coacting shear blades.

In contrast, FIG. 4 is a photograph of a cut on the same 1 mil polyester film as employed for the FIG. 3 shear cut, but with slitting effected as carefully as possible by a sharp commercially available razor blade. The cut is of no higher quality than in FIG. 3. The razor blade executes a wedge cut, with the possibility of even more rapid blade wear and progressively deteriorating cut edge roughness. The microscale serrated edge of the razor blade caused vertically spaced striations running longitudinally of the cut edge.

In addition, razor blades have a greater tendency towards bead formation than shear knives. For example, a 1½ inch radial thickness of ½-mil polyester film cut with a razor blade and wound on a roll was found to have a cumulative bead magnitude of approximately 1⅛ mils. The measurement was made transverse the film with a profilometer, the outer film surface displaying a convex region in the edge vicinity.

FIGS. 5, 6 and 7 show the same 1-mil polyester film of FIGS. 3 and 4, cut by round cross section nylon monofilaments, FIGS. 5 and 7 being in the kerf cut mode and FIG. 6 in the parting mode.

The FIG. 5 cut was made by a 30-denier nylon monofilament running at a speed of 3,000 ft./min. through film advancing at 1,000 ft./min. The FIG. 6 cut was made by a 15-denier monofilament running at 600 ft./min. through film advancing at 800 ft./min. The FIG. 7 cut was made with 15-denier monofilament running at 1,200 ft./min. through film advancing at 700 ft./min.

It will be seen that, in all cases, the cuts have a very high surface quality, with the FIG. 6 cut appearing best of all. However, the very slight roughnesses visible at 2,700 X magnification for the kerf cutting mode are really not objectionable at all and, in practical terms, slit film produced in either mode is equally serviceable.

FIG. 7A shows a kerf cut made by a 15-denier nylon monofilament running at 6,000 ft./min. through a 1½-mil moistureproof coated cellophane film advanced at 250 ft./min. Again, the quality of the cut surface is excellent.

A series of completely successful cutting tests were made at the tabulated monofilament and film speeds using a 30-denier, semidull nylon monofilament at a tension of 30-80 g., as measured by a hand tensiometer subsequent to the monofilament leaving the film.

TABLE I

| Example | Film | Film thickness, inch | Film speed, ft./min. | Film tension, lb./in. | Monofilament speed, ft./min. |
|---|---|---|---|---|---|
| 1 [1] | Polyester | 0.001 | 1,000 | 1 | 3,000 |
| 2 [1] | do | 0.001 | 2,000 | 1 | 9,000 |
| 3 [1] | do | 0.0015 | 500 | 1 | 9,000 |
| 4 [2] | Polyester base magnetic tape | 0.0015 | 500 | 3 | 9,000 |
| 5 [2] | do | 0.0015 | 2,000 | 3 | 9,000 |

[1] 6" wide.
[2] 2" wide.

The film tension for examples 4 and 5 is somewhat higher than for examples 1-3, inclusive, because of the narrower film width.

With the particular magnetic tape employed in examples 4 and 5 it was found desirable to orient the film with the coated surface disposed on top, thereby insuring clean severance thereof without curl-away of the coating accompanying the exiting monofilament.

Further tests were made to investigate the effects of filament denier as well as relative cutting filament and film advance speeds. In these, a 1-mil thick polyester film advanced at a tension of 2½ lbs./in. was slit with a semidull nylon monofilament delustered with 0.3 percent by weight of $TiO_2$.

Table II

| Test No. | Film Speed, ft./min. | Yarn Denier | Yarn Speed, ft./min. | Yarn Tension, g. (hand tensiometer measured) |
|---|---|---|---|---|
| 6 | 100 | 10 | 7,500 | 25 |
| 7 | 200 | 10 | 7,500 | 25 |
| 8 | 500 | 10 | 7,500 | 25 |
| 9 | 200 | 30 | 9,000 | 70 |
| 10 | 400 | 30 | 9,000 | 70 |
| 11 | 500 | 30 | 9,000 | 70 |
| 12 | 500 | 20 | 9,000 | 50 |

The table II tests were all in the kerf-cut mode.

The slitting obtained in tests No. 6 and 9 was not as satisfactory as for the other tests, in that some waviness was noted due to the relatively low film advance speeds.

Tests No. 7, 10 and 11, respectively, exhibited a progressive diminution in waviness, and all three gave acceptable quality cuts.

Tests No. 8 and 12 were excellent.

From the foregoing, it is concluded that in this series of tests there was diminishing waviness as film speed was increased, other variables being held constant. On a microscale, however, edge quality was uniformly good.

Tests No. 8 and 12 showed especially good smoothness of cut, without any bead. In fact, the cut surfaces were so smooth that one could plainly see in Stereoscan photos made of these samples inherent film features arising out of the manufacturing operation. Thus, a lateral cut made on the 1-mil thick film showed a characteristic variation in crystallinity conforming to localized cooling rates, i.e., exposure on one extremity to a quenching drum and on the other to cooling air, whereas there was slow cooling in the intermediate expanse. Film manufacturing specialists affirmed that it was the first time that they were able to perceive such effects in thin gage film, the lower gage range of perceptibility having hitherto been 15-mil thick product, or even thicker. Consequently, this invention enables test cuts for purposes of product manufacturing evaluation.

The effects of delusterant additions were investigated in a series of cutting tests run on 1-mil polyester film using 15-denier nylon monofilaments having the following percentages of delusterants: (1) 0.02% TiO$_2$, giving a bright yarn, (2) 0.3% TiO$_2$, giving a semidull yarn and (3) 2% TiO$_2$, giving a dull yarn. All three modes of slitting were employed. In all of the runs, the monofilaments were run to the breaking point, varying monofilament velocities from 0 to 1,500 ft./min. At a given monofilament speed, film speed was increased in the range from 275 ft./min. to 2,000 ft./min. until the filament broke. Filament tensions were varied from 32 to 55 g. Relative humidity levels of 7 percent and 35 percent were used, and in one series of tests the filaments were run completely wet. No significant effect of delusterant additions on slitting was noted in these runs.

Slits have been appraised in the following two ways: (1) weighing of the filament after passage through the film, and (2) breaking of the down-film filament line and then visually observing the slit contemporaneously produced to determine if operation had been kerf producing or kerfless, as seen in FIGS. 2D and 2E, respectively.

For example, at relatively high-speed filament clear-through levels wherein 15-denier nylon monofilament speed is 9,000 ft./min. and the 1-mil polyester film speed is 500 ft./min., a gain of filament denier of about 25 percent of the weight of the cutaway material has been noted, by measuring the monofilament weight before and after cutting, indicating kerf cutting and material sweep-through by the running filament. In similar tests, run with the monofilament speed decreased to 600 ft./min., i.e., with the monofilament speed nearly equaling the film speed, no denier gain was observed, indicating a change in cutting mode.

A quick, relatively simple, more approximate method of detecting a slitting-mode change is by measurement of tension in the filament line as it leaves the film. The tests reported in table III were made using a 1-mil thick polyester film slit by a 15-denier dull nylon monofilament. A slit was first cut in the film with a scissors and the filament cleared through the slit at 300 ft./min. just back of the terminal point of the cut, so that the film barely opposed some resistance to filament travel. The incoming (hereinafter called "initial") tension of the filament was maintained at 29 g., whereas the tension existing in the exiting filament at a distance of about 4 inches from the underside of the film was measured at the outset of the following tests and found to be 35 g. for the slit film at rest but with filament running through the preslit.

Table III

| Run No. | Monofilament Speed, ft./min. | Film Speed, ft./min. | Tension in g. Measured Below Slit |
| --- | --- | --- | --- |
| 26 | 300 | 100 | 40 |
| 27 | 300 | 200 | 39.5 |
| 28 | 300 | 300 | 37 |
| 29 | 300 | 400 | 35 |
| 30 | 300 | 500 | 34.5 |
| 31 | 300 | 600 | 34.5 |
| 32 | 300 | 700 | 34.5 |
| 33 | 300 | 800 | 34.5 |
| 34 | 300 | 900 | 34.5 |

From table III, it will be seen that, at low relative film speeds there is a perceptible increase in filament tension from 35 g. to 40 g., or just below. Visual examination of the cut obtained confirmed that slitting was in the kerf mode.

In this series of tests, when film and filament speeds were nominally equal, at 300 ft./min. each, the tension had dropped appreciably to 37 g. Here the slit was seen to depart from a full-width kerf dimension by comparison with filament diameter so that, presumably, conditions were on the threshold of the transitional zone.

With progressively increasing relative film-to-filament speed ratios, the filament tension dropped to the vicinity of 35 g. and remained constant, even with further increase in film speed from 400 to 900 ft./min. in successive increments of 100 ft./min. The slitting obtained at film speeds in excess of 400 ft./min. was definitely in the parting mode.

It appears, however, that the slitting mode is, to some degree, at least, a function of absolute filament speed, as shown for the tests of table IV, wherein the same 1-mil polyester film was slit by the same 15-denier dull nylon monofilament, but with the filament speed at 600 ft./min., rather than 300 ft./min. The above-slit filament tension was again maintained at 29 g., whereas the exiting zero film speed tension was 35 g.

Table IV

| Run No. | Monofilament Speed, ft./min. | Film Speed, ft./min. | Tension in g. Measured Below Slit |
| --- | --- | --- | --- |
| 35 | 600 | 0 | 35 |
| 36 | 600 | 100 | 40 |
| 37 | 600 | 200 | 37 |
| 38 | 600 | 300 | 37 |
| 39 | 600 | 400 | 35 |
| 40 | 600 | 500 | 35 |
| 41 | 600 | 600 | 35 |

Total dropoff in tension to the 35 g. level occurred at a film speed of 400 ft./min. and a corresponding filament speed of 600 ft./min., i.e., at a film speed well below equality with filament speed.

A variety of nonwoven webs have recently become available in either trail lots or on a regular commercial basis, these being of two general types; namely, (1) unbonded, comprising consolidated continuous-filament polyester fiber batts, and (2) spun-bonded sheets, comprising polyester, polyethylene or polypropylene continuous filaments, integrally laid down on a foraminous surface and bonded in either a single step or in two steps.

Specimens of unbonded material comprising batts of polyester filament having a basis weight of 4 oz./sq.yd. and an uncompressed thickness of about 0.035 inch were cut in the following three runs:

EXAMPLE 1

Unbonded batt material hand-fed at 50 ft./min. was cut using a 15-denier dull nylon monofilament drawn therethrough at a speed of 9,000 ft./min. Clean cuts were made of individual fibers without the drawing of cut ends from the edges of the sheet, nor were any ends observed only partially severed. Moreover, no localized bunching or plowing of fiber ends ahead of the running monofilament was observed.

EXAMPLE 2

The same material as utilized in example 1 was cut with a 20-denier semidull nylon monofilament run at a speed of 9,000 ft./min., the batt being supported by being taped to a 1-mil polyester film which was, of course, concurrently slit. One run was made at a film-batt speed of 100 ft./min. This example established the feasibility of slitting such batts at speeds greater than hand-feeding, with no detrimental effect. The character of the slit edge compared favorably with that in example 1.

EXAMPLE 3

The experiment of example 2 was repeated with the unbonded batt advanced at a speed of 100 ft./min. past the monofilament. Here support was provided by two polyester tapes disposed longitudinally along the batt in the direction of advance. Slitting of the unsupported batt portion between the tapes was successfully accomplished with the same degree of slit-edge integrity as achieved in example 2.

EXAMPLE 4

This example utilized a 15-denier (semidull) nylon monofilament run at a speed of 9,000 ft./min. and an initial tension of approximately 35 g. to cut spun-bonded polyester sheet of 1.5 oz./sq.yd. basis weight, and about 0.009 inches thickness advanced at speeds up to 50 ft./min. Because of the bonding, this edge had more the appearance of a scissorlike cut on a piece of paper, being quite square without the compressive effect of a cut made with scissors.

Spun-bonded polyethylene of 2.0 oz./sq.yd. basis weight and about 0.007 inch thickness was cut by the same type nylon monofilament using the same filament and web speeds. Results were very similar to those obtained for the spun-bonded polyester specimen.

EXAMPLE 5

A spun-bonded polypropylene sheet supported in sliding relationship with respect to an unattached polyester backing, i.e., the backing was not moved into the cutting zone, and having the following characteristics: 4 oz./sq.yd. basis weight, about 0.015 inch thick, was cut using a 15-denier (semidull) nylon monofilament running at a speed of 9,000 ft./min. and an initial tension of 35 g., the sheet being advanced at a speed of 50 ft./min. Because of the larger denier fibers in this sheet structure and their somewhat greater mobility as compared with the other spun-bonded sheet structures tested, the cut edge had more the appearance of that of the consolidated unbonded batts, but was still highly satisfactory.

EXAMPLE 6

Cellophane film (1.5-mil thickness), thinly coated on both sides with polyvinylidine chloride, was slit in a number of tests reported in the following table V, the cutting filament employed being 15-denier dull nylon monofilament. The initial monofilament tension was 38 g. and the sheet tension was 1 lb./in.

Table V

| Test No. | Monofilament Speed, ft./min. | Film Speed, ft./min. |
| --- | --- | --- |
| 1 | 6,000 | 500 |
| 2 | 6,000 | 250 |
| 3 | 9,000 | 1,000 |
| 4 | 9,000 | 500 |
| 5 | 9,000 | 250 |

In all cases an excellent cut was obtained, as shown in FIG. 7A for run No. 2.

During further testing at a yarn speed of 6,000 ft./min. with the cellophane advanced at 500 ft./min., the filament broke accidentally and visual observation confirmed that cutting was in the kerf mode.

EXAMPLE 7

A 1-mil heat-shrinkable film comprising an ionic copolymer of the type disclosed in U.S. Pat. No. 3,264,272 was slit using a 15-denier nylon monofilament running at a speed of 9,000 ft./min. and an initial tension of 38 g. Satisfactory cuts were obtained at film advance speeds up to 750 ft./min.

Three and one-half-mil film of the same composition was slit with two ends of 15-denier nylon monofilament twisted into a single strand. The strand was driven at a speed of 9,000 ft./min. and slitting was effected at a film advance speed of 500 ft./min. However, the cut was not as smooth as obtained with a single monofilament, due to the uneven cross section of the strand.

EXAMPLE 8

Investigation was had as to the cutting properties of other polymers than nylon, and the following tests confirmed the operability of polyester, polyethylene and polypropylene monofilaments as effective cutting means. Operation was in the kerf mode.

TABLE VI

| Monofilament | Polyester | Polyethylene | Polypropylene |
| --- | --- | --- | --- |
| Denier | 25 | 321 | 26 |
| Finish | None | None | None |
| Monofilament speed, ft./min | 3,000 | 3,000 | 3,000 |
| Monofilament: | | | |
| Initial tension, gm | 35 | 135 | 35 |
| Film slit | Polyester | Polyester | Polyester |
| Film thickness, inches | 0.0005 | 0.001 | 0.0005 |
| Film tension, lbs./in | 1 | 2 | 1 |
| Film speed, ft./min | 500 | 250 | 250 |

Stereoscan microphotographs of the slit edges obtained revealed good smooth, square quality with little or no contamination by removed material.

EXAMPLE 9

This example involved bead trimming a 0.002 to 0.003 inch thick polyester film oriented in the transverse direction. A 250-denier nylon monofilament was used as the cutting means, the initial tension being kept at 250 g. whereas the monofilament running speed was 50 ft./min. Film tension was 4 lbs./in. and the film throughput was 400 ft./min.

Slitting was in the parting mode and this example demonstrated that the process of this invention can be employed to separate bead trim to give a good square edge in a continuous process under relatively high film tensions without tearing in the oriented direction. The slitting speed reported is normal for processing the specific film involved.

EXAMPLE 10

This example investigated the effect of filament guide interspacing above and below the 0.003 inch thick polyester film being slit. The film tension was 2 lbs./in.

The cutting monofilament was nylon. All tests were in the parting mode, as determined by visual observation.

| Test No. | 1 | 2 | 3 | 4 | 5 |
| --- | --- | --- | --- | --- | --- |
| Monofilament denier | 250 | 250 | 250 | 250 | 70 |
| Yarn tension, g. | 250 | 250 | 200 | 200 | 175 |
| Guide spacing, in. | 1 | 0.125 | 0.125 | 2 | 1.5 |
| Monofilament speed, ft./min. | 50 | 50 | 50 | 50 | 200 |
| Film speed, ft./min. | 500 | 500 | 200* | 500* | 200* |

*At these speeds the monofilament broke and slitting was interrupted.

The following conclusions were reached:

Referring to tests no. 3 and 4, increasing the spacing between filament guides while maintaining other conditions constant permitted an increase in the maximum film speed before process failure.

Tests no. 3 and 5 revealed that, by increasing the guide spacing, a lower denier yarn could be used to achieve slitting if, at the same time, the monofilament speed is increased from 50 to 200 ft./min.

If the tension for a given denier of the monofilament is sufficiently high, guide spacing has little discernible effect at film speeds up to at least 500 ft./min., as illustrated by tests no. 1 and 2.

At relatively large guide spacings (e.g., 1inches) the monofilament can angle from a near straight line through the film to a V of as much as 55° with the film face, as measured for test 1 above. Then, to prevent monofilament lateral deflection, a slotted monofilament positioning guide is resorted to, this simply constituting two plates separated slightly greater than the filament diameter and supported just above the upper surface of the film being slit.

Investigation was also made as to interchangeability of, i.e., on-the-run slitting by, first, a razor blade and then a running filament. Twenty shifts from one cutting system to the other were effected during test no. 1 without incident, the quality of the slitting being, of course, much superior for the monofilament. In all cases the transition from one slitting to the other was achieved smoothly, and without noticeable flaws.

EXAMPLE 11

This example demonstrated the slitting of an opaque base film, namely, a coated photographic film base consisting of a 3.5-mil thick filled polyester film (e.g., a highly polymeric ester of a dicarboxylic acid and a dihydric alcohol, such as polyethylene terephthalate), coated on one side with a binder and on the other side with a vinylidene chloride copolymer and a gelatin coating. Such films are taught in U.S. Pat. No. 2,779,684. The film tension was 1 lb./in. and the film throughput was 500 ft./min.

A 250-denier nylon monofilament at 250 g. initial tension, drawn at a speed of 50 ft./min. was utilized for the slitting, which was in the parting mode.

Stereoscan microphotographs of the cut edge revealed a square cut with no debris contamination. This latter is especially imperative with this film, since the film base is subsequently coated with photographic emulsion and any contamination could have a critical effect on the final product.

EXAMPLE 12

This example involved the slitting of rolled-up spun-bonded polypropylene, which is a uniform sheet of adhered continuous filaments of 100 percent linear polypropylene, specifically designed as a backing material for tufted carpets and rugs.

The product had a basic weight of 2.5 oz./yd.² and slitting was effected through 30 layers (approximately one-half inch) of the rolled material using a 250-denier nylon monofilament running at 4,500 ft./min. The initial tension of the monofilament was approximately 75 g.; however, at the onset of cutting, the exiting tension increased to 1,000 g.

The cutting achieved here was surprising, because earlier attempts at cutting polyester films on the roll had failed. Nevertheless, the cut edge was found to be clean and square, with no sheet-to-filament bonding and no entanglement between layers. The cut obtained was kerflike, material being carried away by the monofilament. Kerf cutting was confirmed by unrolling a length of the spun-bonded product from the partially cut roll and observing the cut in the material.

Some difficulty was encountered, in that material removed by the monofilament was subsequently brushed off during the monofilament's transit through the previously cut slot. Some objectionable buildup of debris interfered with progress of cutting past a depth of about three-fourth inch; however, the problem is cured by occasional removal of any cuttings blinding the slit, or by use of the special apparatus of FIG. 2C which removes a one-eighth inch wide section of the rolled sheet intermediate the two monofilaments therein employed.

Conventional nonwoven webs made from staple fibers can also be slit by this invention.

EXAMPLE 13

The following cutting tests were made on assorted poromeric, elastomeric, regenerated cellulose and polymeric materials, with the results reported.

Except as hereinafter indicated, 250-denier nylon monofilaments were used as the slitting means, the monofilament drive speeds being 3,000 ft./min. and the tensions 200 g. All specimens were hand-fed to the slitting filaments at relatively low speed.

a. 0.033 inch thick Corfam poromeric artificial leather sheet. The cut obtained was of the kerf-type with square, smooth clean edges.

b. One one-hundred-twentieth inch thick dental-dam pure amber rubber. The slitting behavior was good; however, the support utilized was inadequate for the material involved and the edge obtained was relatively rough.

c. individual specimens of Neoprene rubber having thicknesses measuring one thirty-second inch, one-sixteeth inch, three thirty-seconds inch, one-eighth inch and three-sixteenth inch. The thickest specimens were advanced against the filament at speeds as low as 2 ft./min. Good kerf cutting was obtained without difficulty, the cut edges being square but somewhat scored when viewed at 80 X magnification.

d. 0.005 inch thick polyimide (i.e., a diamide-dianhydride formulation) film. Monofilament running speed reduced to 50 ft./min. Slit was in the parting mode and a smooth edge was obtained.

e. individual specimens of 7½ inch thick rigid and flexible polyurethane foam were cut with 1,100-denier nylon monofilaments under 250 g. tension driven at speeds of 540 and 750 ft./min., respectively, in the kerf cutting mode. Clean cuts with no dust, debris or jagged edges were obtained in both instances.

f. 0.001 inch thick Nordel polyethylene was kerf-cut on a roll with a 520-denier nylon monofilament under 250 g. tension driven at a speed of 540 ft./min. Successive layers were clean-cut without fusing or debris and the excellent edge obtained had a quality superior to any previously obtained.

g. unsupported commercial 0.0015 inch thick polyester base film magnetic tape carrying a 0.0004 inch thick magnetic iron oxide coating was slit in the parting mode at a tape feed speed of 500 ft./min. with a 70-denier nylon monofilament running at 25ft./min. The tape tension was 6.2 lbs./inch.

Examination at 80 X magnification showed slit edges of acceptable smoothness and squareness; however, there was some slight crazing of the magnetic oxide layer at the edges. This was probably due to the absence of support for the tape in the slitting zone.

h. 1½-mil cellulose acetate film was kerf-cut at a film advance speed of 250 ft./min. and a film tension of approximately 1½ lb./in. with a 30-denier semidull nylon monofilament traveling at 6,000 ft./min. under a tension of 35 g.

The cut edge obtained was examined at 80 X magnification and found to be smooth, square and of excellent quality.

i. a multilayered film consisting of a 5-mil total thickness polyester base coated with polyethylene and then surface-coated with a 10-mil thickness of particulate aluminum oxide adhered with an uncured cross-linking binder material advanced at a speed of 50 ft./min. was kerf-cut with a 250-denier nylon monofilament running at a speed of 100 ft./min. under a tension of 250 g. The cut obtained was examined at 80 X magnification and seen to be smooth and square, with little or no debris. There was no separation of the aluminum oxide coating with respect to the base material.

It has been verified that slit edges produced by both kerf cutting and parting according to this invention have improved tear resistance, due to their square smooth configurations and, possibly, also, to some unidentified alteration in characteristics due to mechanical working.

A standard tear test, ASTM D 1004-66, was utilized to measure the force required to initiate tearing in polymeric films and other sheets cut. According to the test, 4 inches long × three-fourth inch wide specimens are notched to present a central 90° offset indentation transverse the specimen, leaving a specimen width away from the notch presenting a semicircular expanse formed on a ½-inch radius. Each end of the specimen is then gripped in the opposed jaws of an Instron Model TM Tensile Tester provided with screw action grips G-61-1B having rubbercoated grip faces, and tensile pull applied lengthwise of the specimen. A minimum of 10 samples is required for each test.

Control samples carefully cut to shape by sharp razor blades were prepared and compared with specimens cut to shape according to this invention. The results are shown in the following table VII.

Another embodiment of apparatus useful for slitting a single thickness running sheet in all modes is that shown in FIGS. 2A and 2B. This design is particularly advantageous because of the sustained guidance afforded the running monofilament.

The apparatus comprises a pair of cantilevered, freerunning rolls 40 journaled through bearings 41 on stationary shafts 42. Each roll is provided with external shells 44, 45 and 46 attached thereto by keying or heat-shrinking, and spaced longitudinally apart on the rolls to define, between them, circumferential guidance tracks 48 for the running monofilaments. It will be understood that the tracks 48 of the paired rolls lie in the same vertical planes, thus effecting straight run guidance of the monofilaments through the apparatus. The monofilaments drive the rolls by frictional contact therewith, and the sheet 50 to be slit is advanced between the rolls and is restrained against flutter or excessive vertical displacement by contact therewith. Typically, tracks 48 can have a width of 0.005 inch and a depth of 0.031 inch, whereas the throat width between the roll pair can be 0.094 inch.

This apparatus permits a variety of monofilament arrangements, that shown for monofilament 52 being an "S"-wrap. However, the monofilament can, if desired, be trained around the rolls in a reverse sense, to give an inverted "S", or, in fact, the string-up can be as a straight run around the roll pair with the monofilament entirely upstream from the roll pair of entirely downstream, as desired.

Referring to FIG. 2C, there is shown an embodiment of apparatus for slitting sheet material wound into roll form. Here a pair of monofilaments 55a, 55b running adjacent one another is preferably used as the slitting agency.

The apparatus is provided with a stiff bar 56 pivotally supported at one end for rotation about pin 57. The bar carries a pair of filament guide supports 58 and 59, preferably adjusta-

TABLE VII.—TEAR RESISTANCE

|  | Example I [1] | | Example II [2] | | Example III [1] | | Control | Example IV | Example V |
|---|---|---|---|---|---|---|---|---|---|
|  | 0.001″ polyester | | 0.003″ polyester | | 0.0014″ cellophane | | 0.0014″ cellophane | 0.0014″ cellophane | 0.0014″ cellophane |
|  | Control | Test | Control | Test | Control | Test | | | |
| Cut type | (3) | Kerf | (3) | Parting | (3) | Kerf | (3) | Parting | Kerf |
| Monofilament | | Nylon | | Nylon | | Nylon | | Nylon | Nylon |
| Monofilament speed, ft./min | | 9,000 | | 50 | | 9,000 | | 50 | 9,000 |
| Monofilament denier | | 30 | | 250 | | 30 | | 250 | 30 |
| Number of specimens | 10 | 10 | 10 | 10 | 10 | 10 | 10 | 10 | 10 |
| Avc. test strength, lbs | 1.71 | 3.3 | 4.24 | 9.45 | 0.74 | 0.84 | 0.95 | 1.13 | 1.19 |
| Standard deviation, estimated | 0.30 | 0.92 | 0.46 | 1.2 | 0.15 | 0.18 | 0.04 | 0.16 | 0.10 |
| Percent improvement over control | | 93 | | 122 | | 13 | | 19 | 25 |

[1] Tensile Load Cell B, 100 to 2,000 grams.
[2] Tensile Load Cell CT, 50 to 200 pounds.
[3] Razor blade.

NOTE.—Instron Tensile Tester (Model TM, Ser. No. 1525), Screw Action Grips G-61-1B, rubber-coated, grip faces.

From table VII it will be seen that, in all instances, very substantial increases in tear resistance are obtained for cut edges produced by this invention. The improvement can be attributed to both consistent cut edge quality, which prevents microlocalized stress concentrations promoting tearing, and also to material characteristic alteration as a result of mechanical working by the cutting filament, although working is certainly less extensive when cutting is in the parting, as distinguished from the kerf-cut, mode.

The foregoing table VII, example III, for slit cellophane, shows a somewhat smaller improvement in tear resistance than the polyester film, but this is only to be expected, as cellophane is generally lower in strength and also is not so uniform in properties as polymeric films.

The exact cutting mechanism of this invention is not fully understood. Cutting tests made on paper, including 40 lb. Kraft, bond paper and toilet tissue, gave only poor results, in that high-cutting speeds were not obtained and the edges were, in some cases, slightly discolored, perhaps by friction-scorched finish oils. Similarly, thin leather sheets one-sixteenth inch thick could not be cut well.

On the other hand, thin aluminum foils 1 and 3 mils thick were very readily slit in the parting mode, although the cut edges were deflected inwardly somewhat by the exiting nylon monofilament utilized as the cutting agency.

ble in construction both with respect to their lengths extending normal to the bar and also with respect to placement longitudinally of the bar. Guide supports 58 and 59 are spaced wide enough apart to receive between them the roll 61 of sheet material which it is desired to slit. Roll 61 is supported on power-driven shaft 62, which rotates the roll at a speed of from 1 to 100 r.p.m., preferably counter to the course of the monofilaments shown running through filament guides 58a and 59a from left to right as seen in FIG. 2C. Exiting monofilament is led through a directional guide 63 and then is drawn between a pair of pinch rolls 64, 64' to a suitable collection point. Typical running filament speeds are 300 to 9,000 ft./min.

In operation, bar 56 is depressed by hand or by a deadweight application during rotation of roll 61, thereby effecting a progressive full circumferential cut of the rollform sheet. The concurrent use of a pair of adjacent monofilaments for the slitting of roll form material has been found to be advantageous, in that there is thereby obtained better clearance of cutting debris out of the slot cut.

The slitting tests hereinbefore reported were conducted at sheet advance speeds of 2,000 ft./min. or below, because these constitute normal present-day processing practice for the various products involved.

However, our invention is not limited to this low-speed range.

Thus, one-half-mil polyester film advanced at 4,500 ft./min. was slit with a 30-denier nylon monofilament running at a speed of 9,000 ft./min. The cut edge was smooth, square and free of debris. The 10 inch diameter slit film package obtained had no noticeable bead. The cut was observed to be a partial kerf-type, from which it was inferred that operation was on the threshold of the transitional mode at the very high-test speed.

Precisely controlled tensioning of the filament cutting means can be obtained by the use of conventional yarn processing apparatus as described in U.S. Pat. No. 2,989,995. Thus, the filament can be passed between two sets of cot rolls or nip rolls disposed on opposite sides of the sheet material being cut, the associated roll sets being driven at a slight differential speed with respect to one another to provide preselected cutting filament tensioning. Such apparatus eliminates variations in upstream filament tension encountered during unwind from the supply package and also isolates the sheet cutting from the final used filament collection, which is conveniently effected by pneumatic jets or the like as already taught with respect to FIG. 2. Roll sets are preferred over post and disk tensioners as filament guiding means where the filaments might be subjected to scuffing or other surface damage having a deleterious effect on the slitting action.

We claim:

1. A process for slitting sheet material of the type represented by polymeric, poromeric, elastomeric and regenerated cellulose films, nonwoven webs embodying polymeric threads, filaments or staple fibers, and the like comprising advancing said sheet material at a velocity in the range of about 2 ft./min. to about 4,500 ft./min. against a running polymeric filament cutting means having a thickness of about 1–14 mils drawn through said sheet material at a velocity in the range of about 25 ft./min. to about 9,000 ft./min., and collecting the slit product.

2. The process for slitting sheet material according to claim 1 wherein said polymeric filament cutting means is fabricated from one of the group consisting of polyamide, polyester, polyethylene and polypropylene.

3. The process for slitting sheet material according to claim 2 wherein said polymeric filament cutting means contains a particulate solid delusterant.

4. The process for slitting sheet material according to claim 1 wherein said polymeric filament cutting means is a monofilament.

5. A sheet material slit product of the type represented by polymeric, poromeric, elastomeric and regenerated cellulose films, nonwoven webs embodying polymeric threads, filaments or staple fibers, and the like having an edge formed by a polymeric filament cutting means having a thickness of about 1–14 mils drawn through said sheet material at a velocity in the range of about 25 ft./min. to about 9,000 ft./min. while said sheet material is advanced relative to the line of travel of said polymeric filament cutting means at a velocity in the range of about 2 ft./min. to about 4,500 ft./min.

6. Apparatus for slitting sheet material of the type represented by polymeric, poromeric, elastomeric and regenerated cellulose films, nonwoven webs embodying polymeric threads, filaments or staple fibers, and the like comprising, in combination, a polymeric filament cutting means having a thickness of about 1–14 mils, means drawing said polymeric filament cutting means under tension through said sheet material at a velocity in the range of about 25 ft./min. to about 9,000 ft./min., means displacing said sheet material past the line of travel of said polymeric filament cutting means at a velocity in the range of about 2 ft./min. to about 4,500 ft./min., and means collecting the slit product.

7. Apparatus for slitting sheet material according to claim 6 wherein said polymeric filament cutting means is displaced substantially normal to the face of said sheet material in the course of slitting.

8. Apparatus for slitting sheet material according to claim 6 wherein said polymeric filament cutting means is a monofilament.

9. Apparatus for slitting sheet material according to claim 6 wherein said polymeric filament cutting means is fabricated from one of the group consisting of polyamide, polyester, polyethylene and polypropylene.

10. Apparatus for slitting sheet material according to claim 6 wherein said polymeric filament cutting means is substantially circular in cross section.

* * * * *